United States Patent [19]

Pieslak et al.

[11] 4,424,246

[45] Jan. 3, 1984

[54] PATCH CLOSURE SYSTEM

[75] Inventors: George Pieslak, Menlo Park; Barnie A. Wallace, Jr., Palo Alto, both of Calif.

[73] Assignee: Raychem Corporation, Menlo Park, Calif.

[21] Appl. No.: 317,092

[22] Filed: Nov. 2, 1981

[51] Int. Cl.$^3$ .................... B32B 3/26; C09J 7/02
[52] U.S. Cl. .................. 428/63; 138/99; 138/156; 156/86; 428/57; 428/77; 428/343; 428/349; 428/913; 428/914
[58] Field of Search ............ 428/343, 349, 77, 57, 428/63; 156/629, 86, 668; 138/99, 156

[56] References Cited

U.S. PATENT DOCUMENTS

| | | | |
|---|---|---|---|
| 2,975,091 | 3/1961 | Tobey | 428/349 X |
| 3,379,218 | 4/1968 | Conde | 138/99 |
| 3,455,336 | 7/1969 | Ellis | 138/156 |
| 3,530,898 | 9/1970 | Wilson | 138/99 |
| 3,542,077 | 11/1970 | Muchmore | 138/99 |
| 3,574,313 | 4/1971 | Tanaka | 138/99 |
| 3,677,845 | 7/1972 | Roberts | 156/629 |
| 3,770,556 | 11/1973 | Evans et al. | 428/77 |
| 4,200,676 | 4/1980 | Caponigro et al. | 428/57 |

*Primary Examiner*—Thomas J. Herbert, Jr.
*Attorney, Agent, or Firm*—Douglas A. Chaikin; Herbert G. Burkard; Derek P. Freyberg

[57] ABSTRACT

A patch closure system for joining heat recoverable sheet material, especially for covering a substrate where the joined material is to be recovered around the substrate, comprises a layer of adhesive on one surface, a part of which is a pressure-sensitive adhesive and the remainder of which is a heat-activatable adhesive. The pressure-sensitive adhesive layer is of such an area and is placed such that, when the patch is placed over the overlap between the edges of the heat recoverable sheet material, the patch will continue to cover the overlap when the sheet material is recovered, even if the heat-activatable adhesive layer has not been used to attach the patch to the sheet material.

8 Claims, 10 Drawing Figures

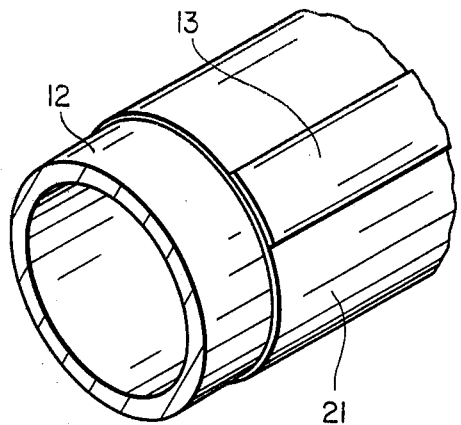
FIG_1
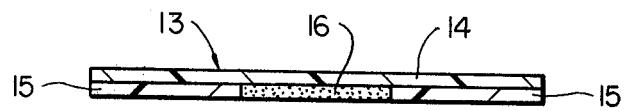
FIG_2
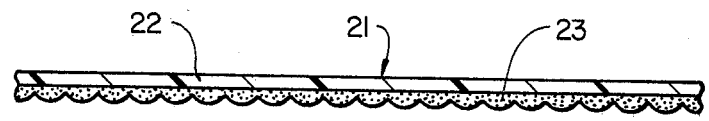
FIG 3
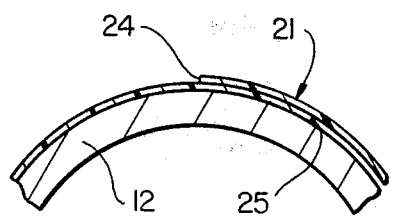
FIG_4
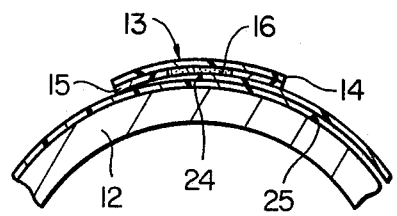
FIG_5

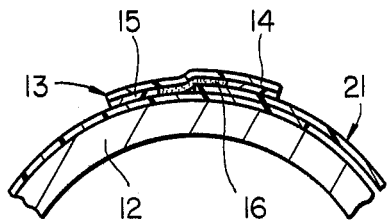
FIG_6
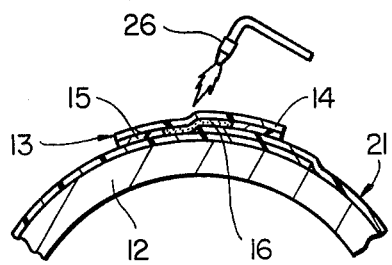
FIG_7
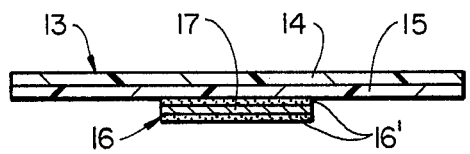
FIG_8
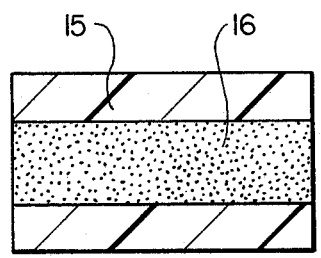
FIG_9
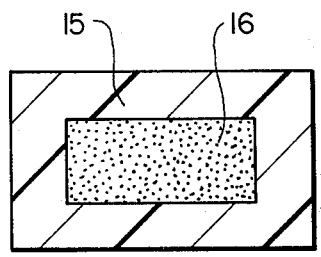
FIG_10

PATCH CLOSURE SYSTEM

BACKGROUND OF THE INVENTION

1. Field of the Invention

This invention relates to a method in which a part of an elongate substrate is covered by overlappingly wrapping a heat-shrinkable polymeric sheet or other similar closure member concentrically around the substrate, securing the overlapping edge and the underlying overlapped portion of the sheet together with a path closure and heating the thereby formed, essentially tubular closure member so that it shrinks into circumferential contact with the substrate.

2. Summary of the Prior Art

Many methods of the kind outlined above are known in the art, and reference may be made, for example, to U.S. Pat. Nos. 3,379,318; 3,455,336; 3,530,898; 3,542,077; 3,574,313, 3,770,556 and U.S. Pat. No. 4,200,676, the disclosures of which are incorporated by reference herein. U.S. Pat. No. 3,770,556 discloses a method in which contact adhesive is provided on opposing surfaces of a wrap-around closure member which opposing surfaces contact each other in the wrapped configuration, and a cover sheet, e.g. aluminum foil, fabric tape or heat-shrinkable plastic, is stuck over the exposed outer edge of the closure member to prevent peeling back thereof during the heat-shrinking of the closure. U.S. Pat. No. 4,200,676 discloses a method in which the wrapped edges of the closure member are secured together by means of a multi-layer cover sheet which comprises a polymeric layer and a reinforcing member and which cover sheet has a coating on its inner surface of a cross-linked hot-melt adhesive. The cover sheet is placed over the exposed outer edge of the closure member and is then heated and pressed against the closure member to secure the edges thereof together prior to heat-shrinking of the closure member.

While the methods of the prior art outlined above are very useful in a number of situations, all of them suffer from one or more disadvantages, such as the need for specially formed edge portions on the closure member, or the inability to form a consistently reliable closure when the closure member has a high recovery force, or when the substrate has an irregular cross-section (e.g. a transition in a pipe system), or when the substrate diameter is small. In particular, the method of U.S. Pat. No. 3,770,556 poses a problem where a wide range of sizes of substrate must be covered. Since both opposing surfaces of the closure member must be coated with contact adhesive the diameter range of the formed closure is perforce limited. Although such a closure member can, merely because it is heat recoverable, accommodate some variation in the substrate diameter, use of a highly expanded material for the closure member imposes recovery forces beyond that which contact adhesives can generally withstand. In addition, contact adhesives almost invariably have poor peel strength in comparison with hot-melt adhesives. Therefore a closure of the type taught by U.S. Pat. No. 3,770,556 would be inappropriate where the closure would be subjected to significant peel forces.

The patch design of U.S. Pat. No. 4,200,676 presents certain difficulties also. First, this patch is of relatively complex and bulky construction and therefore heats up and cools down relatively slowly and further tends to insulate the underlying adhesive layer. In addition, a major shortcoming of the patch design of U.S. Pat. No. 4,200,676 exists in connection with covering substrates of irregular diameter as in the case where a telephone or high-voltage cable transition or a joint between pipes of different diameter is to be covered. To accommodate such a transition the patch must be able to deform (i.e. stretch) in the areas of greatest stress to thereby more evenly distribute the recovery stress and avoid peeling of the patch away from the closure member. The substantially undeformable patch of this prior art cannot stretch significantly and hence is subject to pulling away of the closure in regions of high recovery stress such as is caused by a major diametric transition. Likewise, a reinforced patch is unsuitable for substrates of small diameter since its comparative stiffness makes it difficult or impossible for the installer to conformably wrap it around the closure member which, being flexible, does readily conform to the substrate.

Wallace, U.S. Applications Ser. No. 58,743, filed July 19, 1979 and Ser. No. 172,394, filed July 25, 1980, both now abandoned, the combined disclosure of which has been published as European patent application publication No. 23788 and is incorporated herein by reference, discloses an alternative method wherein the patch is capable of extension in the circumferential direction of the closure. As with U.S. Pat. No. 4,200,676, the adhesive is a cross-linked hot-melt adhesive.

In the case of both U.S. Pat. No. 4,200,676 and European patent application No. 23788, the patch is required to be sealed completely to the closure member before the combined closure is heat recovered; and, in addition, a hot-melt adhesive of high viscosity is required. This increased viscosity is usually produced by cross-linking the adhesive, increasing the cost of the product. Further, although both the above documents suggest that a pressure-sensitive adhesive may be used in combination with the patch, they regard such a use as merely an initial hold-down means for the patch before activation of the hot-melt adhesive, and consider it disadvantageous for its reduction of the total strength of the bond between the patch and closure member, and regard other hold-down means as preferable.

DESCRIPTION OF THE INVENTION

Summary of the Invention

Our invention comprises a patch closure system for joining heat recoverable sheet material, especially for covering a substrate where the joined material is to be recovered around the substrate, wherein the patch comprises a layer of adhesive on one surface, a part of which is a pressure-sensitive adhesive and the remainder of which is a heat-activatable adhesive. The pressure-sensitive adhesive layer is of such an area and is placed such that, when the patch is placed over the overlap between the edges of the heat recoverable sheet material, the patch will continue to cover the overlap when the sheet material is recovered, even if the heat-activatable adhesive layer has not been used to attach the patch to the sheet material.

BRIEF DESCRIPTION OF THE DRAWING

FIG. 1 is a perspective view of a closure member installed in accordance with the present invention.

FIG. 2 is a view in cross-section of a patch member used in the present invention;

FIG. 3 is a view in cross section of a mastic or adhesive coated heat-recoverable closure member useful in the present invention;

FIGS. 4, 5, 6 and 7 illustrate the method of the present invention by which the ends of a closure member are joined;

FIG. 8 is a view in cross-section of an alternative design of a patch member used in the present invention; and FIGS. 9 and 10 are plan views illustrating some possible arrangements of the pressure-sensitive and heat-activatable adhesives on the patch member, especially those where the closure member is to be directly exposed to the environment.

DETAILED DESCRIPTION OF THE PREFERRED EMBODIMENTS

The patch member used in the present invention is preferably of substantially uniform cross-section and composition, and preferably has the layer of adhesive initially adherent to it. The patch member is preferably composed of a polymeric material, which polymer will preferably be cross-linked, e.g. by irradiation, so that it retains strength even when it is heated above its crystalline melting point. However, other materials e.g. aluminum foil can be used. Reinforced patch members of the kind disclosed in U.S. Pat. No. 4,200,676 are also satisfactory. We have found that if the patch member can stretch circumferentially by at least about 5% at any point along its width, it can thereby help to accommodate recovery of the closure member and reduce and more uniformly distribute the shear stress on the adhesive layer. (As the closure member itself is frequently cut from a roll of material, so that its width lies in the axial direction of the substrate and the overlap line is across its width, the term "width" applied to the patch refers to that direction corresponding to the width of the closure member. In this way, the length of the patch lies in the circumferential or transverse direction, and the patch is generally of greater width than length.) Should the quantity/area and placement of the pressure-sensitive adhesive be inadequate, the closure member can exert sufficient recovery force at one or more points to slip away from underneath the patch and thereby expose the substrate. Such incomplete covering of the substrate by the closure member is, of course, totally unacceptable. Often at least a part of the patch should stretch by up to about 5% or even more. Preferably no part of the patch should stretch by more than about 50%. Stretching in excess of about 50% is undesirable as it permits the sheet closure to contract during recovery to such an extent that it may no longer overlap and will therefore not fully cover the substrate, i.e. it will leave only the patch itself over a longitudinal band of the substrate which is likewise unacceptable. The extent by which the patch may stretch is dependent also upon the properties of the carrier layer for the pressure-sensitive adhesive, should such adhesive be coated on a carrier layer rather than directly onto the patch.

When a substrate of varying cross-section is being covered, the patch may stretch only in the area of greatest circumference, and may not stretch at all (or may indeed contract) in other areas. Since the patch will preferably be capable of stretching by at least 5%, it is generally preferred that it should not be heat-shrinkable. However, since the forces generated by recovery of the closure member can overcome forces generated by any tendency of the patch to shrink on heating, it is possible for the patch to be heat-shrinkable. Alternatively, although not preferably, it can be heat-expandable. Since the patch must secure the overlapped portions of the closure member together along substantially the whole length of the closure member overlap, it is preferred that any change in the width of the patch during installation should substantially match any change occurring in the width of the closure member. Generally, this means that its width should remain substantially unchanged during installation. Bearing these points in mind it is preferred that the patch member be composed of a polymeric material which, when heated in the absence of restraint, undergoes a maximum dimensional change in the axial and/or circumferential (i.e. longitudinal and/or transverse) direction of $-10$ to $+10\%$, preferably substantially zero. Unrestrained dimensional changes in excess of $\pm 10\%$ are undesirable because if the patch undergoes such change when unrestrained, it tends to curl under along its periphery during heat recovery thereby inhibiting good adhesion to the underlying closure member and precluding effective sealing. The thickness of the patch member should preferably be less than the recovered thickness of the closure member and most preferably will be less than the thickness of the closure member before recovery.

The width of the patch member is determined by the width of the closure member and will preferably be substantially equal to that of the closure member. Virtually any width of closure member can be successfully accommodated using the patch design of the present invention. The longer the patch, the more likely it is to secure together the overlapping portions of the closure member. Typically the length of the patch will be 2 to 10 inches. With substrates of small circumference, especially when the substrate is of irregular cross-section, the optimum length for the patch will be influenced by both the circumference of the substrate and the shrinkage of the closure member. With a substrate having a generally small diameter but having a sharp diametric transition and a closure member with a high recovery force, slippage on recovery of the marginal portions of the closure member relative to the patch can occur. This problem is readily rectified by use of a slightly longer patch. For this reason, an extensible patch such as is disclosed in European Patent Application No. 23,788 is particularly valuable when the substrate to be covered is of small circumference, e.g. no greater than about 20 inches, especially at most 15 inches, and/or of irregular cross-section, e.g. the ratio of the maximum circumference to the minimum circumference is greater than about 2:1 for a small diameter substrate and/or there is a stepdown (such as over a flange or weld ring) of greater than about 1 inch on a substrate of greater than about 2 inches diameter.

It is the composition and placement of the adhesive layer of the patch that is the key to this invention. It has previously been assumed that an adhesive such as a hot-melt is necessary to provide adequate resistance to dislodgement of the patch, unless both the patch and the closure member are coated with a contact adhesive. Especially, it has been assumed that although a pressure-sensitive adhesive may provide a means of initial hold-down of the patch, the resulting final bond will be weakened by the use of such an adhesive.

Contrary to these prior-art teachings, we have found that certain pressure-sensitive adhesives possess sufficient lap shear strength that, when used on a patch, they can be used to make a closure which can even be heat recovered without the need for a hot-melt or contact adhesive. Examples of adhesives suitable for use in the practice of my invention include Arclad 5190 and 5696 from Adhesives Research Inc., Y966 from 3M and Tackmaster 160 and 165 from National Adhesives. Depending on the materials of the polymeric layer of the patch and the closure member, the thickness of the materials, etc. other adhesives may prove suitable, and the determination of whether a particular adhesive is satisfactory should be a matter of experimentation for one skilled in the art in view of this disclosure.

However, it is generally true that pressure-sensitive adhesives, even those possessing a suitable lap shear strength at the temperature of use, have low peel strengths, so that a patch secured only by a pressure-sensitive adhesive may peel away, subjecting the closure member to possible wrinkling or opening up due to stresses in use. For this reason, the patch also provides for a heat-activatable adhesive layer over a part of the bonding surface, since heat-activatable adhesives typically may have higher peel resistance. By a heat-activatable adhesive is meant a hot-melt or a thermoset adhesive.

The placement of the pressure-sensitive and heat-activatable adhesive layers is not a critical feature provided that (1) sufficient pressure-sensitive adhesive is present on the patch that it can retain the closure member during heat recovery, and (2) sufficient heat-activatable adhesive is present that the peel problem may be minimized. Preferably, (3) the pressure-sensitive adhesive is placed such that wrinkling or skewing of the patch does not occur on heating of the patch and closure member. For these reasons, and the sake of simplicity, a single stripe of pressure-sensitive adhesive placed on the patch so that it will cover the overlap area when the patch is placed over the closure member is particularly appropriate. Many other configurations are possible, such as a partial stripe, or a plurality of stripes perpendicular to the overlap line. Configurations in which hot-melt adhesive lies between regions of pressure-sensitive adhesive along a line perpendicular to the overlap line, such as stripes parallel to the overlap line or a closed configuration of pressure-sensitive adhesive enclosing hot-melt adhesive, are less preferred when the closure member and patch are to be directly exposed to the environment, or when torch heating is to be used, since they tend to encourage wrinkling or bubbling of the patch during the heat recovery. However, when the closure is to be encapsulated (for example by a hot mastic), especially when a heated encapsulating agent will provide sufficient heat for activation of the heat-activatable adhesive and recovery of the closure member, so that edge peeling is of less critical importance and some wrinkling can be tolerated, such configurations may be acceptable or even preferred.

Unlike the adhesives of U.S. Pat. No. 4,200,676 or European patent application No. 23788, the heat-activatable adhesive used in this invention need not be of particularly high viscosity at its tack temperature, since it is not required to restrain movement of the closure member during recovery.

The sheet closure member may be any of the heat-shrinkable polymeric closure members of the type generally known to the prior art which provide a suitable surface for the patch member to adhere to. The present invention encompasses the use of sheet closure members formed by two or more sheet members joined to each other along axially extending bond lines, with at least one of the joints being formed between marginal portions from different closure members by means of a patch member in accordance with the present invention. Good results can be obtained when at least part of the closure member is not heat-recoverable. However, a drawback of a closure member of this kind is that it would be suitable for use only with substrates of a comparatively limited range of circumferential sizes, whereas the preferred procedure in most circumstances is to make use of a uniformly expanded sheet of cross-linked polymeric material such as polyethylene which can be utilized to fit round any size of substrate by merely varying the degree of overlap, which is conveniently 1 to 10 inches. The closure member will normally be 10 to 150 mils thick and have a circumferential expansion ratio of 1.1 to 10, preferably 1.5 to 5, and a modulus ($M_{100}$) at 150° C. of 2 to 200 psi, preferably 30 to 60 psi. Preferably, the closure member is uniaxially expanded in the direction transverse to the longitudinal axis of the substrate. The recovery force of the closure member will usually be 0.1 to 20 pli, preferably 0.5 to 5 pli. It is usually desirable for the closure member to have a coating of an adhesive or mastic on the interior surface of the closure member which interior surface is moved into contact with the substrate when the closure member shrinks. As noted above, the best closure often results when at least part of the interior surface of the first marginal portion which overlaps the exterior surface of the second marginal portion is free from any such coating. However, completely satisfactory results can often be obtained even when the coating of adhesive or mastic covers the whole of the overlap area.

Referring now to the drawings, FIG. 1 shows a pipe 12 having a closure member 21 recovered about it, with the ends of the closure member secured together by patch member 13.

As shown in FIG. 2, the patch member 13 comprises a cross-linked polymeric sheet 14 having a layer 15 of heat-activatable adhesive adherent thereto, with a central portion 16 of pressure-sensitive adhesive.

FIG. 3 is a cross-sectional view of the closure member prior to installation, showing cross-linked heat-shrinkable polymeric sheet 22 having adherent thereto a layer 23 of adhesive or mastic.

FIGS. 4, 5, 6 and 7 illustrate the method of the present invention. As shown in FIG. 4, the closure member 21 is wrapped around the substrate 12 with the marginal portions 24 and 25 overlapping. Then patch 13 is approximately centered over the line formed by the exposed end 24, as shown in FIG. 5, and pressed into firm contact with the closure member 21, as shown in FIG. 6. The placement of the patch on the closure member, and the quantity/area of pressure-sensitive adhesive 16 are such that the overlapping end 24 is securely attached to the underlying end 25. The exposed exterior surface of the closure member is then heated to cause recovery thereof.

Finally the panel 13 is heated, for example, by means of a torch 26 as shown in FIG. 7 or by other suitable heating means, to activate the heat-activatable adhesive 15 and is then pressed into firm contact with the closure member 21. This secures the patch against peelback, as discussed previously. The patch may alternatively be additionally adhered to the closure member by the heat-activatable adhesive before recovery of the closure member, if desired, though this is not usually necessary.

FIG. 8 shows an alternative method of providing the pressure-sensitive adhesive area on the patch. Here, the polymeric layer 14 has been completely coated on one surface with a heat-activatable adhesive 15 and an area of pressure-sensitive adhesive shown generally at 16 has been placed on layer 15. In this Figure, the layer 16 has been shown as comprising two sub-layers 16' of pressure-sensitive adhesive on either side of a carrier layer 17, forming a double-faced adhesive tape. The carrier layer 17 is conventionally polymeric but may be e.g. metal foil. Such a multi-layer pressure-sensitive adhesive layer is believed to be generally preferable when the pressure-sensitive adhesive 16 is placed on the heat-activatable adhesive layer 15. It may also be used when the layer 16 is placed directly on the sheet 14, though it is not considered necessary.

FIGS. 9 and 10 illustrate two methods of emplacing the pressure-sensitive adhesive layer 16 and the heat-activatable adhesive layer 15 on the sheet 14. In FIG. 9, pressure-sensitive adhesive layer 16 forms a complete band across the width of the patch, leaving margins of heat-activatable adhesive layer 15 with which to additionally adhere the ends of the patch. In FIG. 10, the layer of pressure-sensitive adhesive 16 is completely surrounded by a margin of heat-activatable adhesive 15. Other arrangements of the adhesives are, of course, possible consistent with the requisites laid out above, and these Figures are not in any way intended to be limiting of the invention but merely illustrative. Indeed, while FIGS. 9 and 10 are believed to be particularly suitable and convenient for the case where recovery is to be by torch, the reverse of FIG. 10, i.e. where a layer of heat-activatable adhesive is surrounded by a margin of pressure-sensitive adhesive, is believed preferable when the closure member is recovered by a heated encapsulant material, as discussed previously.

The invention is illustrated further by the following Examples.

EXAMPLE 1

The patch member used in this example was 4 inches long and 6 inches wide, and consisted of 20 mil thick cross-linked high density polyethylene sheet having a modulus at 150° C. of 40 psi and having adherent to one surface a layer, 20 mils thick, of hot-melt adhesive. In the center of the hot-melt adhesive was laminated a 3 mil layer of pressure-sensitive adhesive, 3 inches long and 6 inches wide, leaving 0.5 inches of hot-melt exposed, as in FIG. 9.

The patch member was made by coating a sheet of high density polyethylene, which had been crosslinked by irradiation to a modulus at 150° C. of 40 psi, with a layer of an adhesive composition composed of 62% ethylene vinyl acetate copolymer containing about 4% vinyl acetate (Gulf 5250), 10% ethylene propylene diene monomer terpolymer (Vistalon 3708), 25% hydrocarbon tackifier (Nevpene 9500), 2% carbon black, and 1% antioxidant (polymerized 1,2-dihydro-2,2,4-trimethylquinoline, Agerite MA), and laminating with Arclad 5190 pressure-sensitive adhesive.

The closure member used in this example was a uniaxially uniformly expanded sheet of cross linked high density polyethylene, 21 inches long and 6 inches wide, coated with a 70 mil thickness of mastic on one surface.

The substrate used in this example consisted of a steel pipe of outer diameter 6 inches. The closure member was wrapped around the substrate with the mastic layer on the inside and an overlap of 3 inches. The patch was then placed symmetrically over the exposed edge of the sheet and pressed down to activate the pressure-sensitive adhesive thereby forming a tube. The exposed surface of the tube was then heated by means of a flame torch to cause the recovery of the tube and to activate the hot-melt adhesive under the patch.

EXAMPLE II

The procedure of Example I was followed except that the pressure-sensitive adhesive was Y966 (3M Company).

EXAMPLE III

The procedure of Example I was followed except that the pressure-sensitive adhesive was Arclad 5696.

EXAMPLE IV

The patch member used in this example was 4 inches long and 6 inches wide and consisted of 20 mil thick crosslinked high density polyethylene sheet having a modulus at 150° C. of 40 psi and having centrally located and adherent to one surface thereof a 3 mil layer, 3 inches long and 6 inches wide, of pressure-sensitive adhesive, the outer edges of the sheet (0.5 inches long and 6 inches wide) being coated with 10 mil or hot-melt adhesive. The patch member was made by laminating onto the sheet of high density polyethylene which has been crosslinked by irradiation to a modulus at 150° C. of 40 psi, a layer of pressure sensitive adhesive Arclad 5190 and hot bonding (laminating) onto the sheet strips of the hot-melt adhesive described in Example I.

The closure member used in this example was the same as that described in Example I.

The substrate used in this example was a steel pipe 6 inches in diameter.

The closure member was wrapped around the substrate, with mastic coating on the inside and with an overlap of about 3 inches. The patch was then placed symmetrically over the exposed edge of the sheet and pressed down to activate the pressure-sensitive adhesive, forming a tube. The exposed surface of the tube was then heated with a flame torch to cause recovery of the sheet and to activate the hot-melt under the patch.

EXAMPLE V

The procedure of Example IV was followed except that the pressure sensitive adhesive was Y966 (3M).

EXAMPLE VI

The procedure of Example IV was followed except that the pressure-sensitive adhesive was Arclad 5696.

In each of these examples, the patch retained the closure member during recovery, so that a satisfactory covering of the substrate was afforded.

I claim:

1. A heat-recoverable wraparound patch closure comprising:
   a layer of cross-linked, heat-recoverable polymer, the polymer layer having opposed ends, wherein one end overlaps the other end upon assembly defining a line of overlap and the polymer layer having a first surface and
   means for retaining; the line of overlap before, during and after heat recovery of the polymer layer located on the first surface of the polymer layer, the retaining means including;
   i. means centrally located on the the first surface for retaining the line of overlap before and during heat recovery consisting of
      a. a pressure sensitive adhesive, and b. reinforcing means for preventing movement of the pressure-sensitive adhesive with respect to the polymer layer during heat recovery; and ii. means for retaining the line of overlap after heat recovery occupying the remainder of the first surface of the patch consisting of heat-activatable adhesive being activatable at a temperature greater than the initial temperature of heat recovery of the polymer layer and which is applied directly to the polymer layer.

2. The patch closure of claim 1, wherein the reinforcing means comprises the pressure sensitive adhesive applied directly to the polymer layer.

3. The patch closure of claim 1 wherein the reinforcing means comprises a heat-activatable adhesive being activatable at a temperature greater than initial heat recovery of the polymer layer, which is applied directly to the polymer layer and wherein the pressure sensitive adhesive is applied directly to the heat-activatable adhesive.

4. The patch closure of claim 1 wherein the reinforcing means comprises a laminate having a carrier layer between two pressure sensitive adhesive layers.

5. The patch of claim 1 wherein the patch is generally stretchable.

6. The patch closure of claim 1 wherein the pressure-sensitive adhesive comprises a single strip parallel to one of the axes of the polymer layer.

7. The patch closure of claim 6 wherein the length of the strip of the pressure-sensitive adhesive is approximately two-thirds the length of the polymer layer.

8. The patch closure of claim 6 wherein the width of the pressure-sensitive adhesive is substantially the same as the width of the polymer layer.

* * * * *